Feb. 17, 1942.  R. T. HUMPHREY  2,273,574
WHEEL BRAKE MECHANISM
Filed Aug. 22, 1939  5 Sheets-Sheet 2

Inventor
R. T. Humphrey
By Philip A. H. Terrell
his Attorney

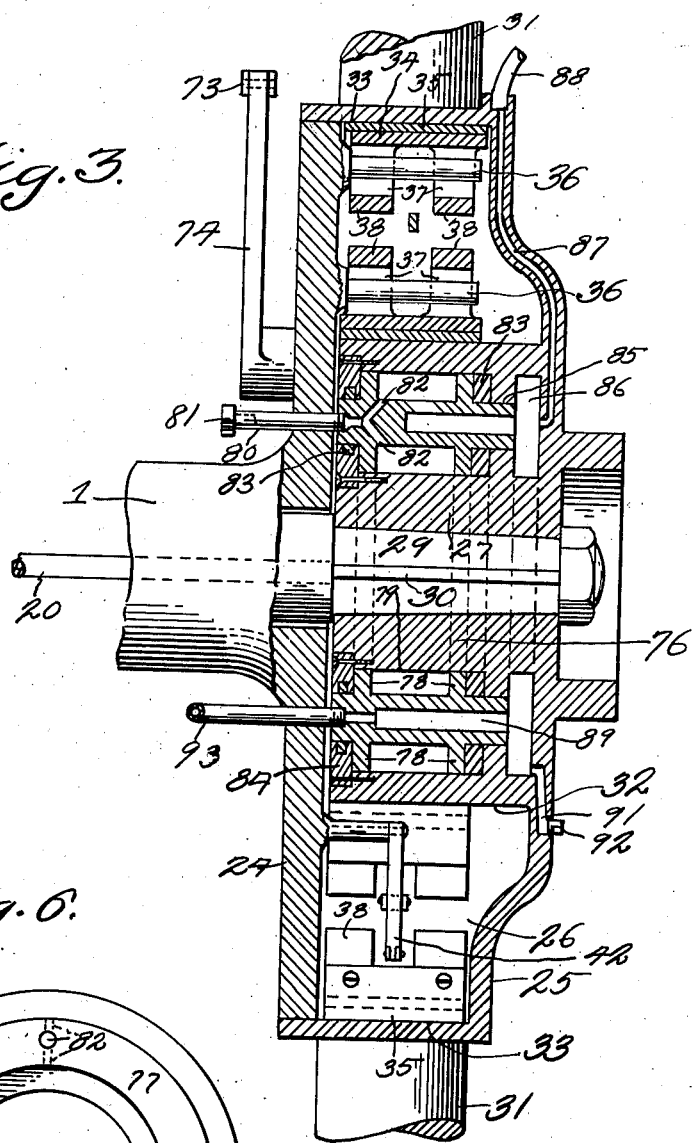
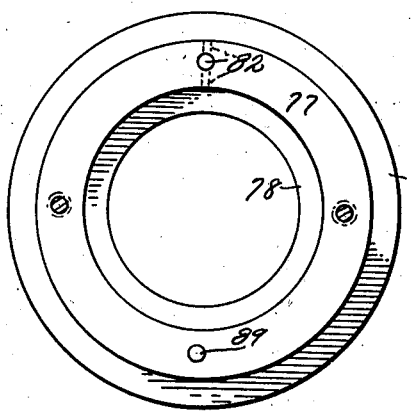

Feb. 17, 1942. R. T. HUMPHREY 2,273,574
WHEEL BRAKE MECHANISM
Filed Aug. 22, 1939 5 Sheets-Sheet 4

Inventor
R. T. Humphrey
By Philip A. H. Terrell
his Atty.

Feb. 17, 1942. R. T. HUMPHREY 2,273,574
WHEEL BRAKE MECHANISM
Filed Aug. 22, 1939 5 Sheets-Sheet 5

Inventor
R. T. Humphrey
By Philip A. H. Terrell
atty.

Patented Feb. 17, 1942

2,273,574

UNITED STATES PATENT OFFICE 2,273,574

WHEEL BRAKE MECHANISM

Robert T. Humphrey, Longwood, Fla.

Application August 22, 1939, Serial No. 291,408

6 Claims. (Cl. 188—74)

The invention relates to fluid operated vehicle brakes, and has for its object to provide a brake comprising brake shoes actuated by partially rotated cams linked together and one of said cams having a link connection to a fluid actuated member.

A further object is to provide manually operated mechanism for controlling the brakes when desired.

A further object is to provide valve means in connection with the pressure reservoir and controlled by a pedal, and by means of which valve air pressure may be supplied to all the brakes for a braking operation or allowed to exhaust from all the brakes for releasing the brakes.

A further object is to provide a vehicle brake of the internal type wherein the brake shoes are radially movable by cams rockably mounted between the shoes and linked together for simultaneous movement. Also to provide an air cylinder into which air is forced for operating a piston having connection to the link connection between the operating cams.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a vertical transverse sectional view through one of the rear brakes and a portion of the axle housing on line 3—3 of Figure 2.

Figure 6 is a view in elevation of one of the annular stationary members within the brake mechanism.

Figure 1:
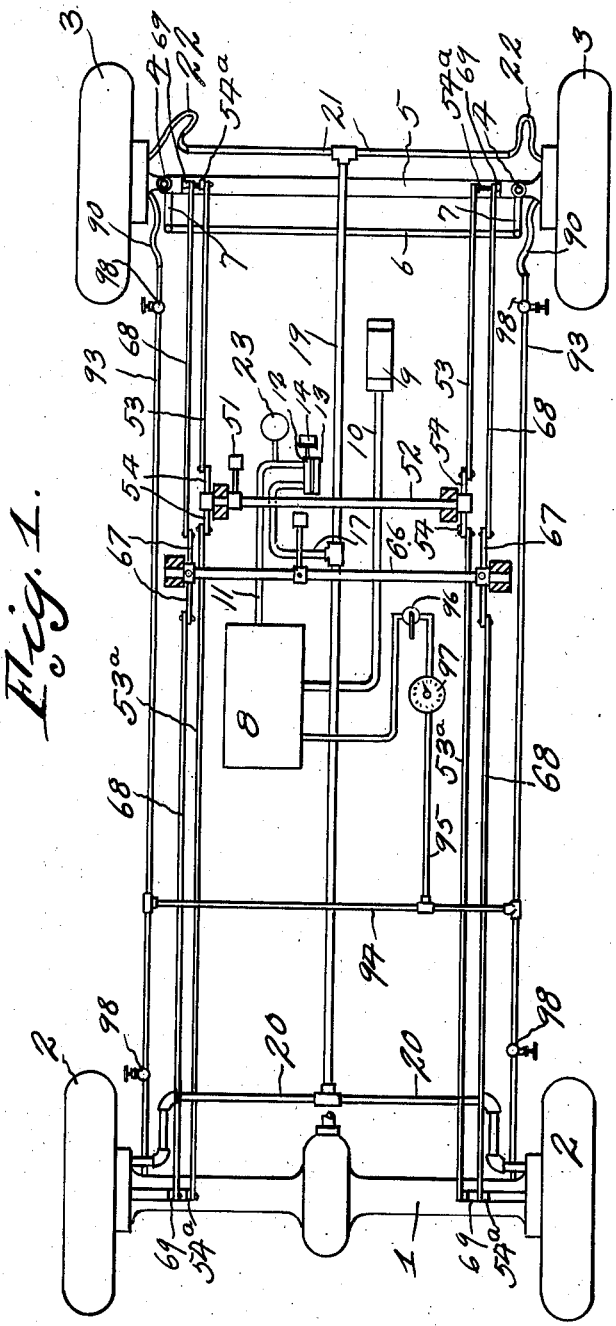
Figure 1 is a top plan view of a conventional form of automobile running gear showing the device applied thereto.

Referring to the drawings, the numeral 1 designates the rear axle housing and 2 the rear wheels of a conventional form of motor driven vehicle. The front wheels 3 are the stub axle type and are hingedly connected at 4 to the front axle 5 of the vehicle. Wheels are moved for steering purposes in the usual manner through the medium of a connecting rod 6, laterally moved in any suitable manner, and which connecting rod is connected to the spindle arms 7, all of which is conventional structure.

The construction of all four brakes is substantially the same and the numerals apply to all of said brakes, however it is obvious for air connections to the front wheels, that modified supply means for the air must be provided to allow the use of the wheels for steering purposes.

Figure 7:
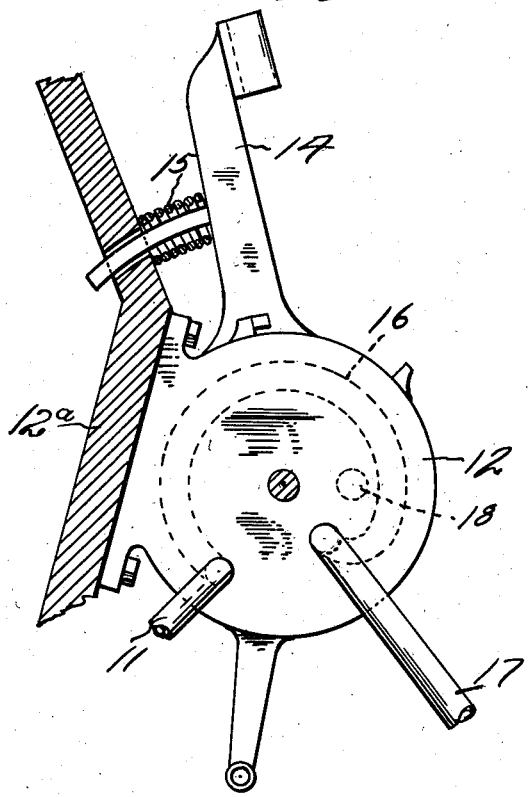
Figure 7 is a view in elevation of the air brake control valve and pedal, showing the parts in brake applying position.
Figure 8:
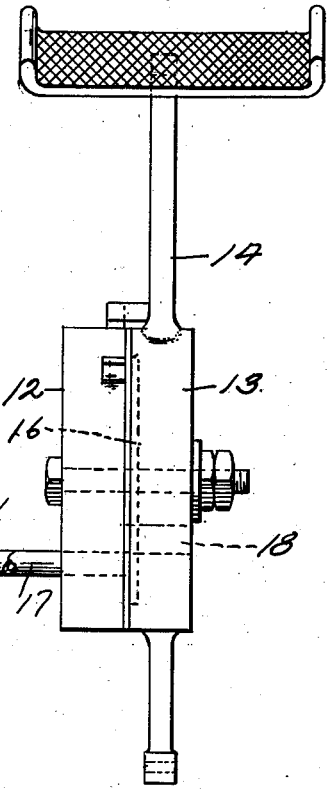
Figure 8 is a view in elevation of the brake control valve.
Figure 10:
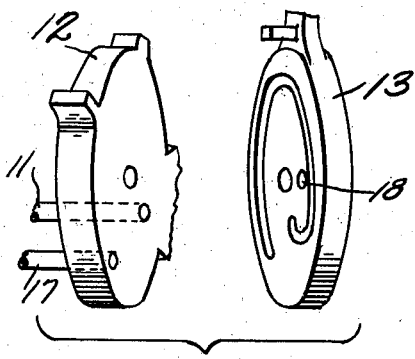
Figure 10 is a collective detailed perspective view of the valve elements, showing the ports therein.
Figure 9:
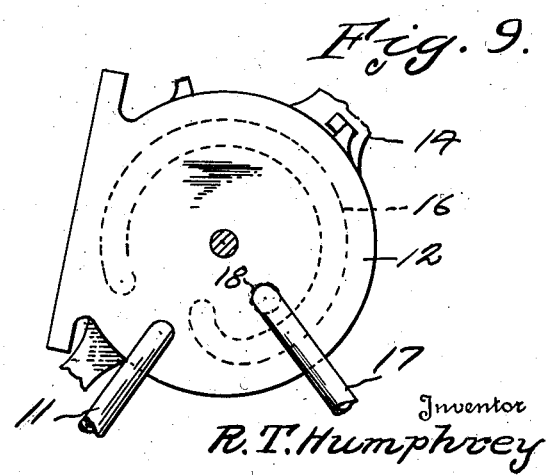
Figure 9 is a side elevation of the brake control valve showing the parts in brake release position.

Disposed in any suitable position on the vehicle is a pressure tank 8 into which air is pumped by means of a conventional form of pump 9 through a pipe 10. The reservoir 8 is provided with a discharge pipe 11 which leads to a stationary valve disc 12, secured to a portion 12a of the vehicle adjacent the operator's seat. Pivotally connected in face engagement with the disc 12 is a pedal disc 13 having a pedal 14 thereon, and which disc 13 is adapted to be rotated by the foot of the operator against the expansive action of the spring 15 for controlling the operation of the brakes. Pedal disc 13 is provided with an arcuate port 16, which when in the position shown in Figure 7 allows the passage of air from the pipe 11 to the pipe 17 on the discharge side of the control valve. When the pressure is relieved on the pedal, the pedal disc 13 rotates to the dotted line position shown in Figure 9, and at which time the supply of air to the brakes is cut off and the pipe 17 is in registry with an exhaust port 18 in the pedal disc, thereby allowing an exhaust of air from the brakes to the atmosphere, consequently a simultaneous release of all the brakes. Air pipe 17 is connected to a longitudinally extending pipe 19, the rear end of which terminates in branch pipes 20 leading to the rear brake mechanisms through the ends of the axle housing 1. The forward end of the air pipe 17 terminates in branch pipes 21, the ends of which are provided with flexible pipe connections 22 to the brake mechanisms of the front wheels, which mechanism is hereinafter set forth. Air discharge pipe 11 is preferably provided with an air gauge 23, located adjacent the operator's seat so the pressure can be observed at all times.

Brake mechanism

Each brake mechanism comprises a stationary housing 24, that is a non-rotative housing and a brake casing 25 having a chamber 26 therein. The brake casing is provided within the chamber thereof with a hub portion 27 which is rotatably mounted on the axle spindle 28 in the case of the front wheel and is keyed on the rear axle spindle 29 by means of a key 30, this being one of the differences in front and rear wheel structures, however in both cases the axle casing rotates for rotating the wheel along with its spokes 31. The spokes may be attached to the rotating casing in any way desired, and applicant does not limit himself in this particular.

Disposed within the chamber 26 and between the internal and external brake drums 32 and 33 are semi-circular shaped brake shoes 34, which brake shoes are provided with liners 35 which engage and grip the brake drums 32 and 33 when they are forced apart and radially moved. The brake shoes are guided in their inward and outward movement by means of guide bolts or studs 36 which extend through elongated slots 37 of spaced lugs 38 carried by the shoes.

The brake shoes are provided with opposed arcuately disposed cam surfaces 38a and interposed between said cam surfaces are cam members 39 which are rigidly carried on transversely disposed rock shafts 40 and are on opposite sides of the axis of said rock shafts. It will be noted that the cams are in corresponding positions and through a link connection when one is rocked all of said cams will be rocked for a braking operation or a releasing operation. Cam shafts 40 and the bolts 36 are carried by the housing plate 24, therefore it will be seen that these parts do not rotate with the driven casing.

Each shaft 40 is provided with arms 41, which arms are linked together by means of links 42, therefore it will be seen that when the shaft 40, adjacent the cylinder 43 is rocked, all of said cams will be rocked and the shoes forced apart for the braking operation. The rock arm 41, adjacent the cylinder 43, is provided with a second arm 44, which has a sliding connection at 45 to the piston rod 46, and the piston rod is provided with a piston 47 within the cylinder 43, and which piston is normally forced downwardly by means of an expansion spring 48. The control of the braking operation is through the control of piston 47 within the cylinder 43.

The pipe 22 extends through the plate 24 and discharges into the upper end of the cylinder 43. The pressure in the cylinder 43 builds up and passes the check valves 49 in the piston and in the auxiliary chamber 50, and as this pressure builds up the piston 47 remains stationary with equal pressure on opposite sides thereof. When it is desired to release the brake it can be manually done by depressing the pedal 51 which rocks the shaft 52 and imparts a pull on the connecting rods 53 and crank arms 54. The crank arms 54, when moved, pull on the connecting rods 53 and 53a, and which connecting rods terminate adjacent the brakes of each wheel and are connected to crank arms 54a of rock shafts 55. The rock shafts are rockably mounted in bearings and in the case of the forward wheel brakes above the spindles and have universal connections 56 with the rock shafts 57. The bearing shaft 55 does not rotate with the spindle. Each rock shaft 57 is provided with an arm 58 having a link connecton 59 to a valve control arm 60 which controls a valve 61 in the pipe 62 leading to the auxiliary chamber 50, therefore it will be seen that when it is desired to release the brakes, it will only be necessary for the operator to depress the pedal 51 for opening the valve 61 and allow the air within the auxiliary chamber and below the piston to escape to the atmosphere. Contractible springs 63 are provided which connect the brake shoe segments so they are normally forced towards each other and against the cam action so the shoes will not drag on the brake drums when not in use. The cylinder 43 is provided with an extension 64 which is received in a socket 65 carried by one of the brake shoe segments, clearly shown in Figure 2.

Figure 2:
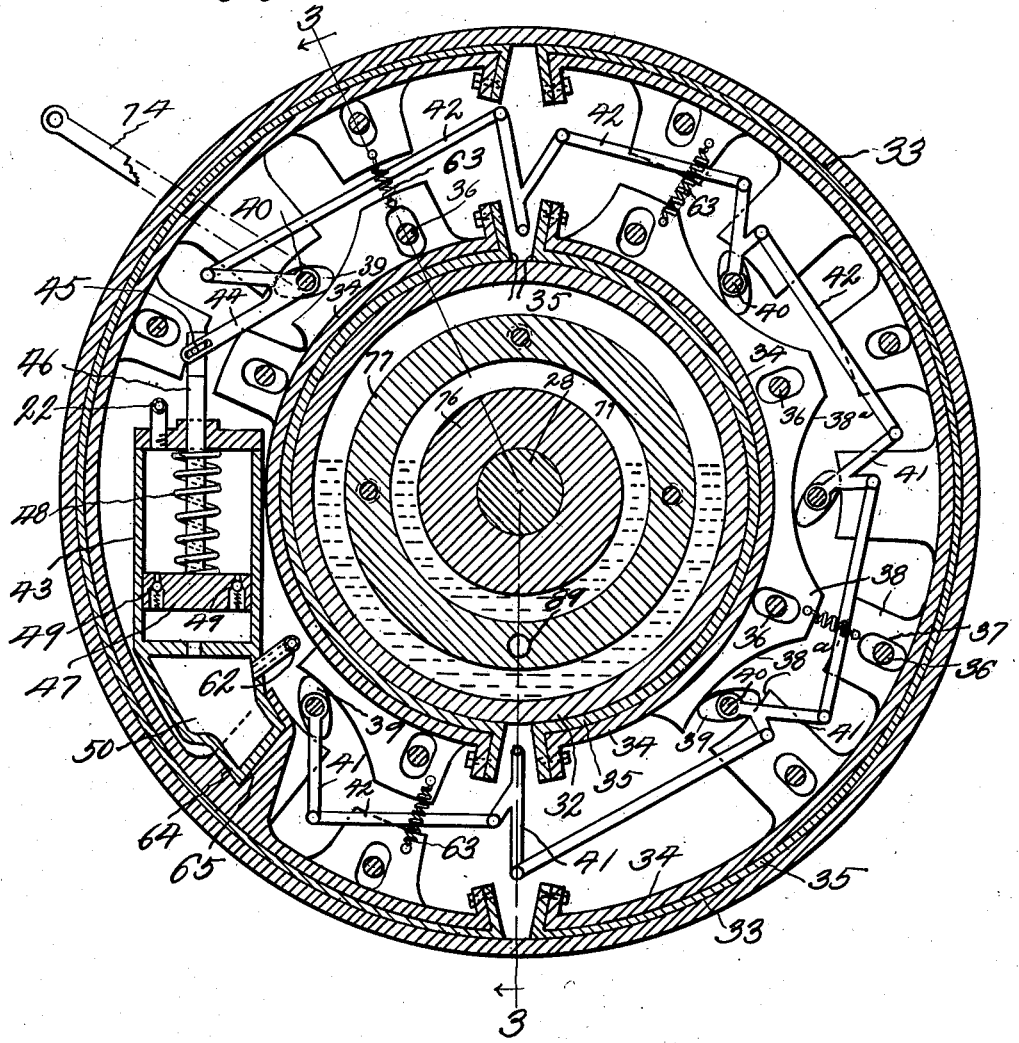
Figure 2 is a vertical longitudinal sectional view through one of the fluid operated brakes.
Figures 4, 5:
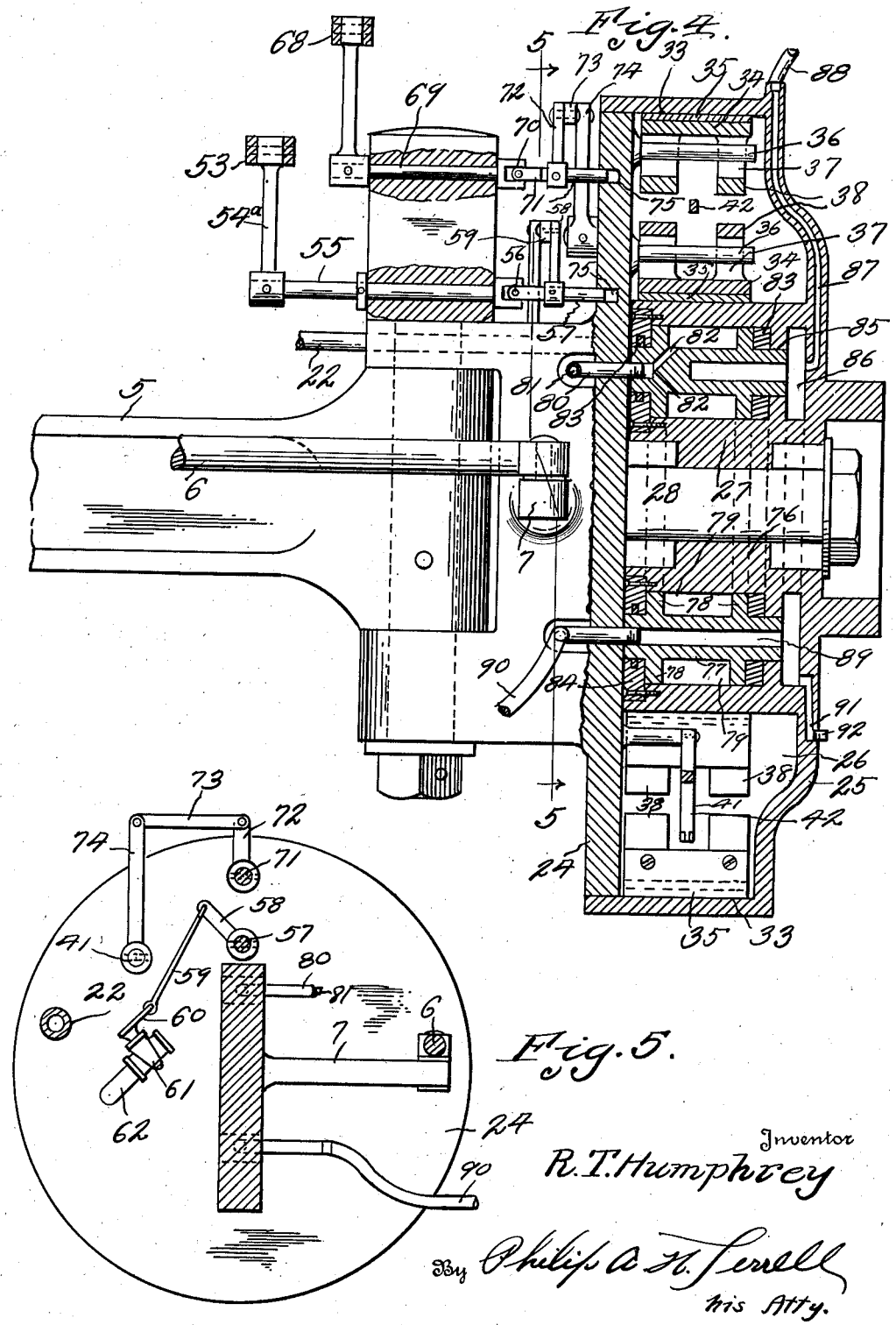
Figure 4 is a view similar to Figure 3, but through one of the front hubs and brakes.
Figure 5 is a vertical transverse sectional view taken on line 5—5 of Figure 4.

The operation of the brake is as follows; reference being had particularly to Figure 2, wherein the piston is shown in neutral position. When a braking operation is desired the pedal 14 is depressed, this allows the passage of air pressure from tank 8 through pipes 17, 19, 21 and 22 into the upper end of the cylinder 43. This air pressure passes through the check valves 49, building up an equal pressure below and above the piston without moving the piston. The pedal 14 is then allowed to move slightly in the reverse direction under the influence of the spring 15 until the pipe 17 and exhaust port 18 register, and when in this position the air pressure above the piston 47 is relieved through pipe 22 and the piston 47 moves upwardly compressing the spring 48 incident to the pressure below the piston, consequently rotates the cams 39 for setting the brakes. After this operation the pedal 51 is depressed for a brake releasing operation, thereby allowing exhaust of pressure to the atmosphere through valve 61 and pipe 62 below the piston. The spring 48, during this exhaust operation, returns the piston 27 to neutral position as shown in Figure 2.

The manual operating mechanism for the brake comprises a pedal operated rock shaft 66, which is provided with arms 67 to which are connected rods 68. Each rod 68 terminates adjacent one of the brakes and is connected to a rock shaft 69 on the spindle center, and which rock shaft is provided with a universal connection 70 to a second rock shaft 71. The rock shaft 69 is stationary and does not rotate with the spindle. The rock shaft 71 is provided with an upwardly extending arm 72 having a link connection 73, which is in turn connected to a lever 74 carried by one of the cam shafts 41, therefore it will be seen that the brake may be manually operated if desired, however during this manual operation the air relief valve 61 is open to allow easy reciprocation of the piston 47 in the cylinder 43. The air on the opposite side of the cylinder piston being allowed to escape through the pipe 22, pipe 21, pipe 19 and control valve and exhaust port 18 therein. It will be seen that the brakes may be fluid operated or manually operated as desired. By providing slip connections 75 between the rock shafts 57 and 71, in connection with the universal joints 56 and 70, the parts may swing with the axle, particularly the front axle on substantially the center of the spindle.

Tire inflating mechanism

Disposed within the inner brake drum 32 and around the hub 76 is an annular member 77. This member is bolted or otherwise secured to the stationary plate 24 and is provided with spaced internal and external flanges 78 forming therebetween a lubricant receiving chamber within and without the ring and designated by the numeral 79. Lubricant is fed into these chambers through a pipe 80 which may receive a plug 81, and which pipe extends through the stationary plate 24 and is in communication with the annular chambers 79 through ports 82, therefore it will be seen that the ring, although stationary, is well lubricated during rotation of the brake casing 25. To prevent leakage of lubricant felt gaskets 83 are provided on opposite sides of the ring. It will be noted that the annular member 77 is held in position by means of a retaining ring 84. The outer sides of the stationary ring 77 are disposed in annular channels 85, which channels are in communication with the air chamber 86, which surrounds the hub. Air is fed to the tires from the chamber 86 through the discharge port 87 and to a pipe 88, which may be of any construction, and which pipe leads to the tire valve. This pipe may be a permanently fixed one if desired. Air is fed to the air chamber 86 through the port 89, extending transversely through the annual member 77 and from a flexible pipe connection 90. The air chamber 86 is provided with a drain opening 91 having a removable plug 92, and by removing the plug, fluid, such as condensation, may be drained from the chamber 86. The flexible pipes 90 are connected to air pipes 93, and which pipes are cross connected by a pipe 94 having an air supply pipe 95 leading to the air reservoir 8. Pipe 95 is provided with a control valve 96 located adjacent the operator's seat so that the tires can be simultaneously inflated. A pressure gauge 97 is preferably provided to indicate the amount of pressure within the tires at all times. Valves 98 may be provided in the pipe line 93 adjacent the wheels for controlling the flow of air to any particular tire from a point adjacent the tire; in which case the valve 96 is open.

From the above it will be seen that a combined tire inflating and braking mechanism is provided which is simple in construction, and one wherein the air inflating mechanism is disposed within the brake mechanism. It will also be seen that a fluid operated brake is provided of an internal and external type, and which brake has disposed between segmental shoes thereof rockable cams linked together and operated from a single piston disposed between the shoes, thereby providing a compact brake structure entirely housed.

The invention having been set forth what is claimed as new and useful is:

1. A brake comprising internal and external rotatable brake drums, radially movable segmentally shaped brake shoes cooperating with said drums, cam surfaces carried by said brake shoes, rockable cams mounted between the cam surfaces of the brake shoes, link connections between said cams and disposed between the brake shoes for simultaneously rocking the cams and actuating means connected with one of the cams for rocking all of said cams through the link connections.

2. A device as set forth in claim 1 including stationary guide bolts extending through radially elongated apertures in the brake shoes for radially guiding the shoes towards each other and contractible springs connecting said shoes.

3. A device as set forth in claim 1, said actuating means comprising a manually operated lever connected to said one cam.

4. A device as set forth in claim 1 wherein the link connections between the cams are circumferentially arranged.

5. A device as set forth in claim 1 wherein the cams of the shoes are arcuately disposed in reverse relation to each other and the rockable cams comprise cam arms on opposite sides of their rocking points.

6. A device as set forth in claim 1 including a stationary plate to the inside of the brake and supporting means for said brake shoes and link connections carried by said plate.

ROBERT T. HUMPHREY.